(12) United States Patent
Banerjee et al.

(10) Patent No.: US 12,182,845 B2
(45) Date of Patent: Dec. 31, 2024

(54) SYSTEM, METHOD, AND NON-TRANSITORY COMPUTER READABLE MEDIUM FOR GENERATING RECOMMENDATIONS

(71) Applicant: Walmart Apollo, LLC, Bentonville, AR (US)

(72) Inventors: Debanjana Banerjee, Kolkata (IN); Amlan Jyoti Das, West Bengal (IN); Srujana Kaddevarmuth, Cupertino, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 127 days.

(21) Appl. No.: 17/483,469

(22) Filed: Sep. 23, 2021

(65) Prior Publication Data

US 2023/0093756 A1 Mar. 23, 2023

(51) Int. Cl.
*G06Q 30/0601* (2023.01)
*G06F 16/2457* (2019.01)
*G06F 16/9535* (2019.01)
*G06F 16/9538* (2019.01)
*G06N 5/02* (2023.01)

(52) U.S. Cl.
CPC ... *G06Q 30/0631* (2013.01); *G06F 16/24578* (2019.01); *G06F 16/9535* (2019.01);
(Continued)

(58) Field of Classification Search
CPC .......... G06Q 30/0631; G06Q 30/0633; G06Q 30/0601–0645; G06F 16/24578;
(Continued)

(56) References Cited

U.S. PATENT DOCUMENTS 10,346,901 B1 * 7/2019 Serbanescu ........ G06Q 30/0643
2011/0276432 A1 11/2011 Bolivar et al.
(Continued)

OTHER PUBLICATIONS

Al-Lohibi, H., Alkhamisi, T., Assagran, M., Aljohani, A., & Asia, O. A. (2020). Awjedni: A reverse-image-search application. ADCAIJ : Advances in Distributed Computing and Artificial Intelligence Journal, 9(3), 49-68. doi:http://dx.doi.org/10.14201/ADCAIJ2020934968 (Year: 2020).*

(Continued)

*Primary Examiner* — Jeffrey A. Smith
*Assistant Examiner* — Ashley D Preston
(74) *Attorney, Agent, or Firm* — Morgan, Lewis & Bockius LLP; Manita Rawat

(57) ABSTRACT

A system can include a database and a computing device. The computing device is configured to receive an item recommendation request corresponding to an asset from an analyst device and select a set of item identifiers of a plurality of item identifiers. An associated published timeframe of the selected item identifiers is related to a present timeframe. The computing device is further configured to determine a composite similarity value for each item identifier of the set of item identifiers comparing a similarity of the asset to each item identifier of the set of item identifiers. The computing device is also configured to generate an item recommendation list including each item identifier of the set of item identifiers with a corresponding composite similarity value above a threshold value and transmit the item recommendation list to the analyst device for display.

20 Claims, 6 Drawing Sheets

(52) U.S. Cl.
CPC ........... *G06F 16/9538* (2019.01); *G06N 5/02* (2013.01); *G06Q 30/0633* (2013.01)

(58) Field of Classification Search
CPC ... G06F 16/9535; G06F 16/9538; G06N 5/02; G06N 20/00
USPC ............................................... 705/26.1–27.2
See application file for complete search history.

(56) References Cited

U.S. PATENT DOCUMENTS

| | | | |
|---|---|---|---|
| 2014/0289069 A1* | 9/2014 | Bhardwaj | G06Q 30/0631 705/26.7 |
| 2016/0086240 A1 | 3/2016 | Musgrove et al. | |
| 2017/0068989 A1 | 3/2017 | Reddy et al. | |
| 2019/0236085 A1* | 8/2019 | Galitsky | G06F 40/35 |
| 2019/0378204 A1* | 12/2019 | Ayush | G06Q 30/0643 |
| 2020/0090251 A1* | 3/2020 | Desrosiers | G06Q 30/0633 |

OTHER PUBLICATIONS

Vue.ai, "AI-Powered eCommerce Product Data Platform," https://vue.ai/products/product-data-platform/, 40 pages.

Schröder and Rahmann, Algorithms Mol Biol (2017) 12:21, "A hybrid parameter estimationalgorithm for beta mixtures and applications to methylation state classification."

Poorheravi et al., "Hierarchical Subspace Learning for Dimensionality Reduction to Improve Classification Accuracy in Large Data Sets," May 25, 2021, 6 pages.

\* cited by examiner

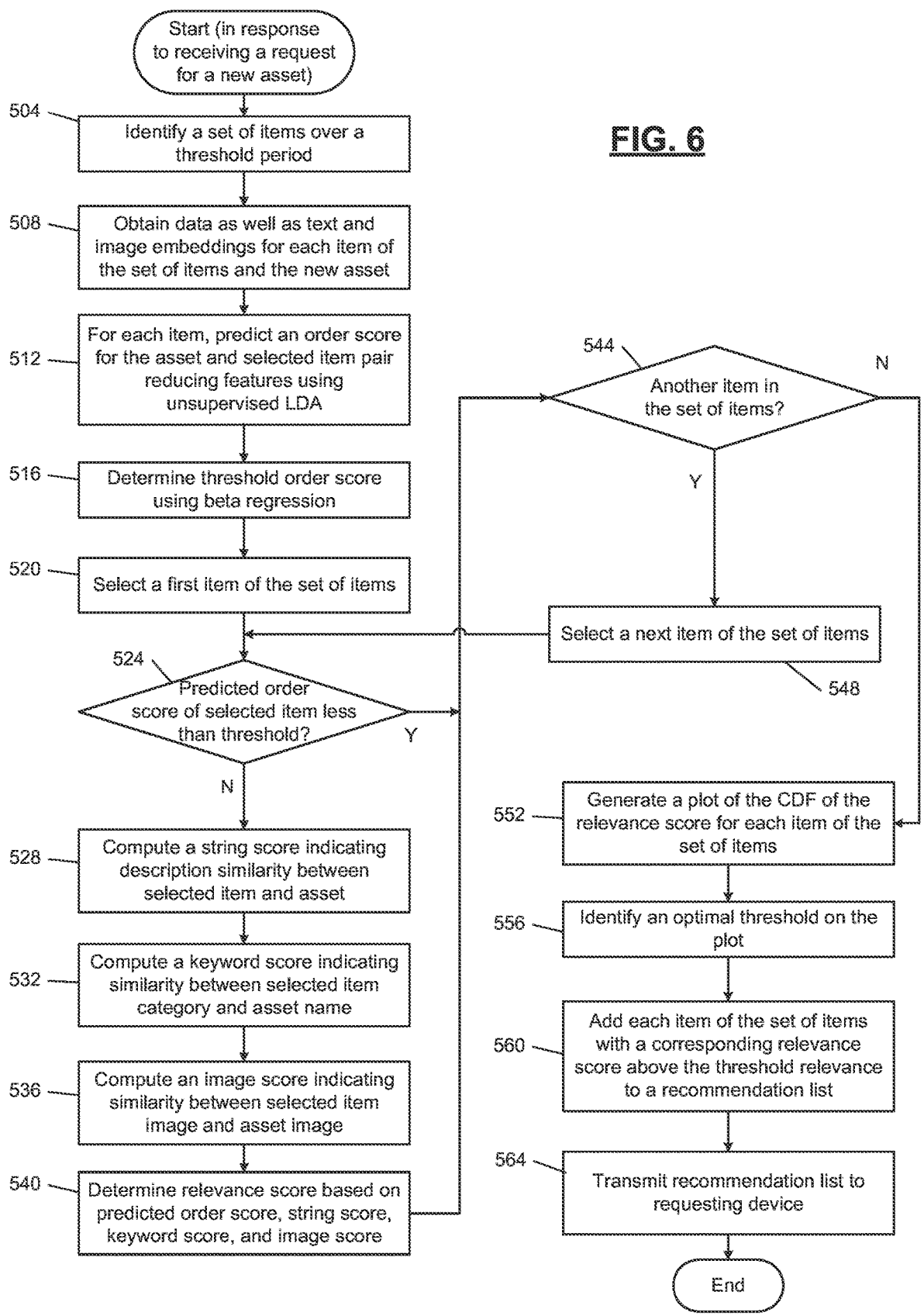

SYSTEM, METHOD, AND NON-TRANSITORY COMPUTER READABLE MEDIUM FOR GENERATING RECOMMENDATIONS

TECHNICAL FIELD

The disclosure relates generally to systems and methods for generating item recommendations for an asset based on, for example, a similarity determination between database entries using improved machine learning.

BACKGROUND

Manually coordinating and pairing images to create an asset is extremely time consuming and subjective. For example, an asset on an entity's website may be a collection of items for sale that are staged in the asset. The asset may be a user-selectable icon and, upon a user selecting the asset icon on a website, the user may be directed to another webpage including the items displayed in the asset icon, including links to purchase those items. While the asset icon may be created to be directed to a small subset of items shown in the asset icon, individuals may select additional items shown in the asset icon that are relevant to the small subset of items. This manual process is very subjective and involves the individual filtering through various potential items, resulting in extensive amounts of time being invested.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The embodiments described herein are directed to a system and related methods. The system can include a database and a computing device. The database stores a plurality of item identifiers and a plurality of asset identifiers. Each item identifier of the plurality of item identifiers is associated with item data and a published timeframe, and each asset identifier of the plurality of asset identifiers is associated with asset data and a previously published indicator. The computing device is configured to receive an item recommendation request corresponding to an asset from an analyst device and select a set of item identifiers of the plurality of item identifiers. The associated published timeframe of the selected item identifiers is related to a present timeframe. The computing device is further configured to determine a composite similarity value for each item identifier of the set of item identifiers comparing a similarity of the asset to each item identifier of the set of item identifiers. The computing device is also configured to generate an item recommendation list including each item identifier of the set of item identifiers with a corresponding composite similarity value above a threshold value and transmit the item recommendation list to the analyst device for display.

In another aspect, the computing device is configured to, in response to determining the asset is a new asset based on the corresponding previously published indicator, extract asset features from corresponding asset data. The computing device is further configured to extract item features for each item identifier of the set of item identifiers from respective item data and reduce a number of the extracted asset features and item features. The computing device is configured to compute an order score for each item identifier of the set of item identifiers using a predictive model based on the reduced number of the extracted asset features and item features and reduce the set of item identifiers based on the corresponding order score being less than a determined threshold order value.

In another aspect, reducing the number of the extracted asset features and item features includes implementing linear discriminant analysis.

In another aspect, reducing the set of item identifiers includes applying a beta regression to the computed order scores for each item identifier of the set of item identifiers and determining the threshold order value as a pre-defined sample quantile.

In another aspect, the predictive model implements a machine learning algorithm using feedback received from the analyst device. The feedback includes approval of at least one item on the transmitted item recommendation list or rejection of at least one item on the transmitted item recommendation list.

In another aspect, for a selected item identifier, the composite similarity value is based on a similarity between a text description of the asset included in the asset data and a text description of the selected item identifier included in the item data.

In another aspect, for a selected item identifier, the composite similarity value is based on a similarity between keywords of the asset included in the asset data and keywords from a category description of at least one category corresponding to the selected item identifier included in the item data.

In another aspect, for a selected item identifier, the composite similarity value is based on a similarity between an image of the asset included in the asset data and an image of the selected item identifier included in the item data.

In another aspect, for a selected item identified, the composite similarity value is a harmonic mean of a plurality of similarity values.

In another aspect, the computing device is configured to, in response to determining the asset is an existing asset based on the corresponding previously published indicator, compute an order score for each item identifier of the set of item identifiers based on historical data related to the asset and the respective item.

In various embodiments of the present disclosure, a method of recommending is provided. In some embodiments, the method can include receiving an item recommendation request corresponding to an asset from an analyst device and selecting a set of item identifiers of a plurality of item identifiers. An associated published timeframe of the selected item identifiers is related to a present timeframe. The plurality of item identifiers and a plurality of asset identifiers are stored in a database. Each item identifier of the plurality of item identifiers is associated with item data and a published timeframe, and each asset identifier of the plurality of asset identifiers is associated with asset data and a previously published indicator. The method can also include determining a composite similarity value for each item identifier of the set of item identifiers comparing a similarity of the asset to each item identifier of the set of item identifiers. The method further includes generating an item recommendation list including each item identifier of the set of item identifiers with a corresponding composite similarity value above a threshold value and transmitting the item recommendation list to the analyst device for display.

In various embodiments of the present disclosure, a non-transitory computer readable medium is provided. The non-transitory computer readable medium can have instructions stored thereon, wherein the instructions, when executed by at least one processor, cause a device to perform operations that include receiving an item recommendation request corresponding to an asset from an analyst device and selecting a set of item identifiers of a plurality of item identifiers. An associated published timeframe of the selected item identifiers is related to a present timeframe. The plurality of item identifiers and a plurality of asset identifiers are stored in a database. Each item identifier of the plurality of item identifiers is associated with item data and a published timeframe, and each asset identifier of the plurality of asset identifiers is associated with asset data and a previously published indicator. The operations can also include determining a composite similarity value for each item identifier of the set of item identifiers comparing a similarity of the asset to each item identifier of the set of item identifiers. The operations further includes generating an item recommendation list including each item identifier of the set of item identifiers with a corresponding composite similarity value above a threshold value and transmitting the item recommendation list to the analyst device for display.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The features and advantages of the present disclosures will be more fully disclosed in, or rendered obvious by, the following detailed descriptions of example embodiments. The detailed descriptions of the example embodiments are to be considered together with the accompanying drawings wherein like numbers refer to like parts and further wherein:

FIG. 6 is a flowchart of example methods of generating item recommendations for a new asset in accordance with some embodiments.

In the drawings, reference numbers may be reused to identify similar and/or identical elements.

DETAILED DESCRIPTION

Figure 1:
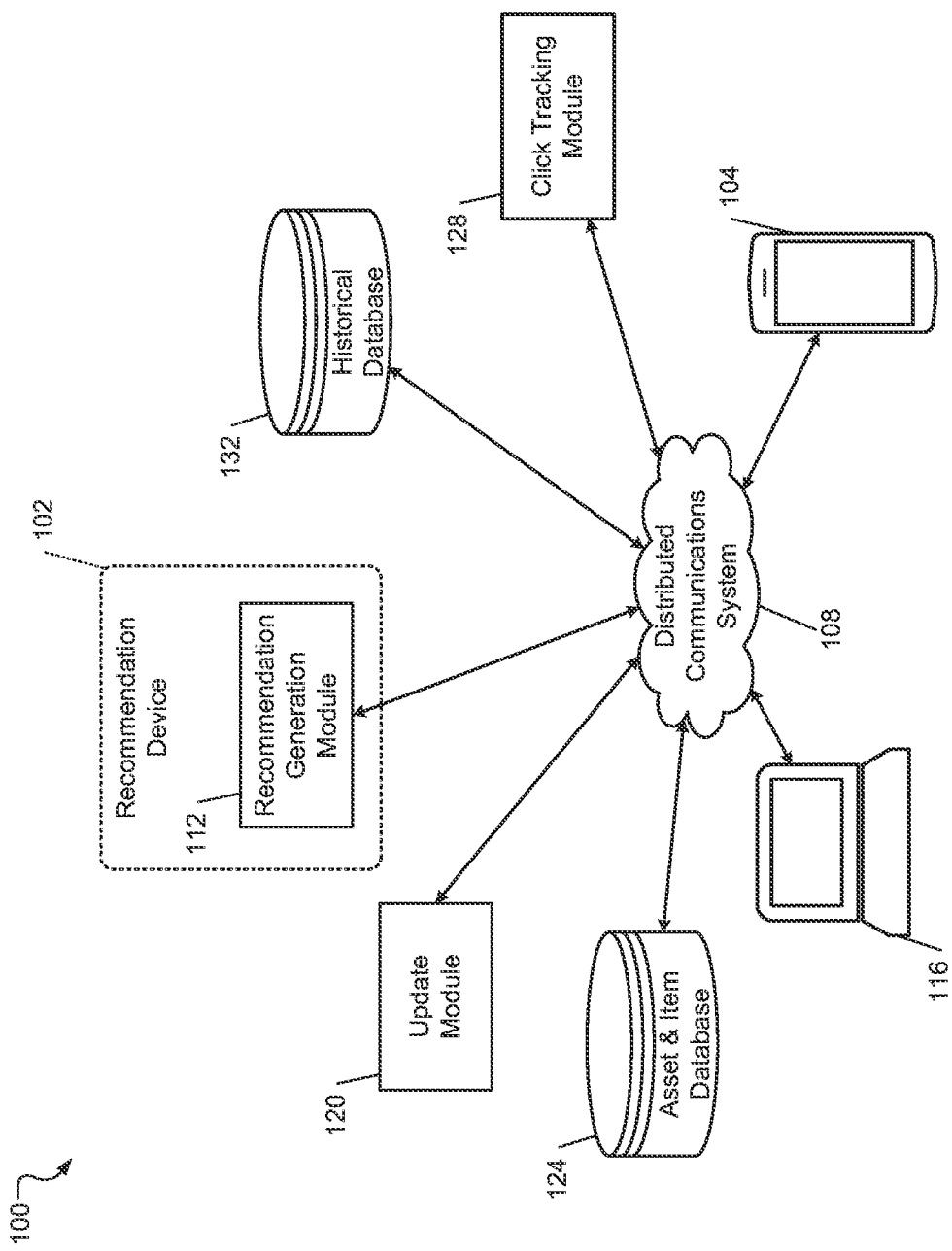
FIG. 1 is a block diagram of a system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

A system may be implemented in a system or by an entity, for example, an ecommerce marketplace, to generate item recommendations corresponding to a particular asset. That is, the system may receive an asset, for example, from an analyst device associated with the entity, and generate a recommendation list of items that are relevant to the received asset. In this way, the system returns a set of recommendations to the analyst device and the analyst operating the analyst device may select a subset of the recommended items to include with the asset in an asset icon, displayed on a webpage for which additional items may be added based on the recommended items.

In various implementations, asset icons may be a picture including a variety of items that are relevant to each other. For example, an asset icon may be a picture of a bathroom including rugs, a soap holder, a soap dispenser, towels, and other items related to the asset icon. The items displayed in the picture may be available for purchase by the entity operating the webpage displaying the asset icon. In various implementations, upon a user browsing the webpage using a customer device, the user may select a particular asset icon and be redirected to another webpage listing the items in the selected asset icon, which are available for purchase. That is, if the user were interested in purchasing one or more of the items in the asset icon, the user would select the asset icon to purchase the particular item online.

The system identifies a set of items to recommend based on a relevance score for an asset and item pair, indicating how relevant a particular item is to the asset. The relevance score is based on four other scores: an order score, a string score, a keyword score, and an image score. In various implementations, the relevance score is calculated as the harmonic mean of the above four scores. The order score, for each potential item and asset pair, indicates a likelihood or frequency of a user purchasing a particular item as a result of viewing or clicking on the asset. The string score indicates a semantic similarity of the text description of the asset and the item using an unsupervised learning algorithm, such as GloVe (global vectors) embeddings. The keyword score indicates a semantic similarity between keywords describing the particular item and the asset name using unsupervised machine learning, such a text rank algorithm and weighted GloVe embeddings. The image score indicates a similarity between the particular item image and the asset image using machine learning, for example, EfficientNet, to extract image features and then determine a similarity between the extracted features.

The system can identify relevant items for an existing asset that has been displayed on the entity's webpage, meaning that historical data tracking or click exists for the existing asset. Additionally, the system can recommend items for a new asset that has not been previously displayed or published on the entity's website, meaning that historical tracking or click data does not specifically exist for the new asset. When determining the relevance score between an existing asset and each item of a set of items, the system computes the order score (likelihood or frequency of purchasing a particular item as a result of selecting the existing asset icon) using historical data stored in a historical database. However, order score alone does not determine relevance of an item to a selected asset. To compute relevance between an existing asset and an item, string score, keyword score and image score, discussed below, are measured along with order score.

The historical database can include information linking an item to an asset, such as purchases of items immediately resulting from a selection of an asset icon, purchases of items within a number of days of selecting an asset icon, searches using keywords associated with an item displayed in an asset icon resulting in a purchase, etc. That is, historical data indicating a relevance between items and an asset. For existing assets, the historical data indicating the frequency of a purchase of an item occurring as a result of the existing asset can be used to compute the order score. Similarly, the string score may be computed using feature vectors generated from asset and item text to determine the cosine similarity of the item and asset text descriptors, the keyword score may be computed using feature vectors of term frequency of category tags or names of the item and name of the asset to determine the cosine similarity, and the image score may be computed using feature vector representations of the asset image and item image to determine the cosine similarity. In various implementations, each of the scores are normalized before computing the harmonic mean to determine the relevance score between the existing asset and each item. Then, those items corresponding to relevance scores above a particular threshold may be returned to a requesting device (e.g., the analyst device) in a recommendation list.

For a new asset, the historical database of the system does not include any data regarding a propensity of frequency of a purchase of any item as a result of selection of display of the new asset (since the new asset has not been launched). Instead, the system implements machine learning algorithms to predict the order score for each item and the new asset. For example, the system includes a predictive model builds to predict the order score of a new asset. In various implementations, the predictive model implements beta regression and unsupervised linear discriminant analysis (LDA) to reduce the dimensions across features for analysis and to discard certain new asset and item pairs below a threshold for identifying as many new asset and item pairs that may be relevant. The predictive model may also implement supervised machine learning algorithms that are trained used validated data or feedback from analysts receiving the recommendation lists.

The predicted order score is based on image and text embeddings for the new asset and a set of potentially relevant items, which are used as features to determine the order score and to indicate similarity across the pairs. Implementation of LDA reduces the number of features for analysis while beta regression of the predicted order scores further discriminates between the scores to discard new asset and item pairs below a threshold order value. Additionally, the threshold order value may be determined based on the generated beta regression of the predicted order scores. The system can then compute the relevance score for each new asset and item pair using the predicted order scores along with the string score, image score, and keyword score. To further reduce the number of items considered relevant, the system plots a cumulative distribution function (CDF) of the relevance scores and determines a threshold relevance score using differential equations (indicating a point at which the CDF plot levels off after an identified inflection point). Those items with corresponding relevance scores above the threshold relevance score are included in the recommendation list of items for the new asset. In various implementations, the predictive model may be trained using data collected over time, such as historically identified relevant items for existing assets, which are validated using analyst feedback.

Once the recommendation list is returned to, for example, the analyst device, the analyst may select which items to include in the asset. In various implementations, the analyst may upvote or downvote items (provide feedback) in the recommendation list for a particular asset, which may be stored in the historical database and used to further train the predictive model. For example, the determined recommendation list for existing assets and upvotes or downvotes for existing or new assets may be incorporated in the predictive model to train the predictive model on at threshold intervals, such as every two weeks, twice a month, monthly, etc. After a subset of the recommended items are selected to be included in the asset, the system saves the asset and item pairs, generates an updated asset, and implements or updates (or launches) an indicated webpage to display the updated asset icon. While selection of the updated asset icon may direct the webpage to another webpage listing the items of the asset for purchase, selection may also direct the webpage to another asset.

Referring to FIG. 1, a block diagram of a system 100 is shown. The system 100 may include a recommendation device 102 and a customer device 104, such as a phone, tablet, laptop, mobile computing device, desktop, etc., that interacts with the recommendation device 102 via a distributed communications system 108. A customer may navigate a webpage operated by an entity, such as an ecommerce marketplace, and purchase items, browse items, etc. via the customer device 104, which includes a user interface for display of the webpage. The recommendation device 102 may include a recommendation generation module 112 that receives a recommendation request for a particular asset from an analyst device 116 and returns a recommendation list to the analyst device 116 via the distributed communications system 108. The analyst device 116 may be a computing device, similar to the customer device 104, and may be used to view the recommendation list, including data corresponding to each recommended item.

From the analyst device 116, the operator or analyst may select a subset of the recommended items to include in an updated asset (a combination of the particular asset included in the recommendation request and the selected item(s)). In various implementations, the analyst may arrange the updated asset on the user interface of the analyst device 116 to rearrange and organize the updated asset. An update module 120 may receive the updated asset generation request from the analyst device 116 and create the updated asset icon and add the updated icon to an asset and item database 124. When a user is navigating the entity's webpage on the customer device 104, the webpage loads assets and items from the asset and item database 124 to display to created assets. In various implementations, the asset and item database 124 also includes information corresponding to each asset and item, including a text description, categories or keywords associated with the items, images, etc.

The system 100 may also include a click tracking module 128 to track user interactions with assets and items on the webpage operated by the entity. For example, a user may execute a purchase of an item on the entity's webpage on their customer device 104 and the click tracking module 128 records and stores a history of the user's selections in a historical database 132. Therefore, the frequency of a purchase of a particular item as a result of a selection of a particular asset may be tracked and analyzed based on how many selections or clicks are between an asset and purchase of an item. In various implementations, the click tracking module 128 may associate items with assets if a threshold number of selections between the asset and item purchase is not exceeded.

Additionally or alternatively, the click tracking module 128 can associate a purchased item with an asset even when a number of days pass between asset interaction and item purchase. For example, if a user select a particular asset and views items within the asset and a number of days later searches for one of the items and purchases the item, the click tracking module 128 may associate the item with the asset, indicating the asset increases the propensity or frequency of item purchases. These associations are stored in the historical database 132, indicating historical purchase propensity data for assets and items over a threshold period, for example, the last three years. The recommendation generation module 112 may access the asset and item database 124 and the historical database 132 to generate a relevance score for each asset and item pair (when prompted by an analyst device or at threshold intervals).

The recommendation device 102, the customer device 104, and analyst device 116 can each be any suitable computing device that includes any hardware or hardware and software combination for processing and handling information. For example, the term "device" and/or "module" can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, the distributed communications system 108. In various implementations, the devices, modules, and databases may communicate directly on an internal network.

As indicated above, the recommendation device 102, the customer device 104, and/or the analyst device 116 can be a computer, a workstation, a laptop, a server such as a cloud-based server, or any other suitable device. In some examples, the customer device 104 and/or the analyst device 116 can be a cellular phone, a smart phone, a tablet, a personal assistant device, a voice assistant device, a digital assistant, a laptop, a computer, or any other suitable device. In various implementations, the recommendation device 102, including all the modules and databases, is on a central computing system that is operated and/or controlled by a retailer. The recommendation device 102 may include modules to execute purchases for items selected by customers using the customer device 104. Additionally or alternatively, the modules and databases of the recommendation device 102 are distributed among one or more workstations or servers that are coupled together over the distributed communications system 108.

The described modules and databases of the recommendation device 102 can cause an ecommerce marketplace to be displayed or otherwise communicated to the customer device 104 via one or more websites. Customers can view, browse, and order items that may be made available for purchase via the ecommerce marketplace as well as provide feedback to the ecommerce marketplace. The recommendation device 102 can collect feedback data or data items via additional modules and databases to update predictive models and/or associate items with assets. Similarly, the recommendation device 102 can store such information and/or send such information for storage in additional databases of the recommendation device 102.

The databases described can be remote storage devices, such as a cloud-based server, a memory device on another application server, a networked computer, or any other suitable remote storage. Further, in some examples, the databases can be a local storage device, such as a hard drive, a non-volatile memory, or a USB stick.

The distributed communications system 108 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The distributed communications system 108 can provide access to, for example, the Internet.

The customer device 104 and the analyst device 116 may communicate with the recommendation device 102 over the distributed communications system 108. For example, the recommendation device 102 may host one or more websites or obtain feedback from one or more websites. The customer device 104 and the analyst device 116 may be operable to view, access and interact with the websites hosted by the recommendation device 102.

Figure 2:
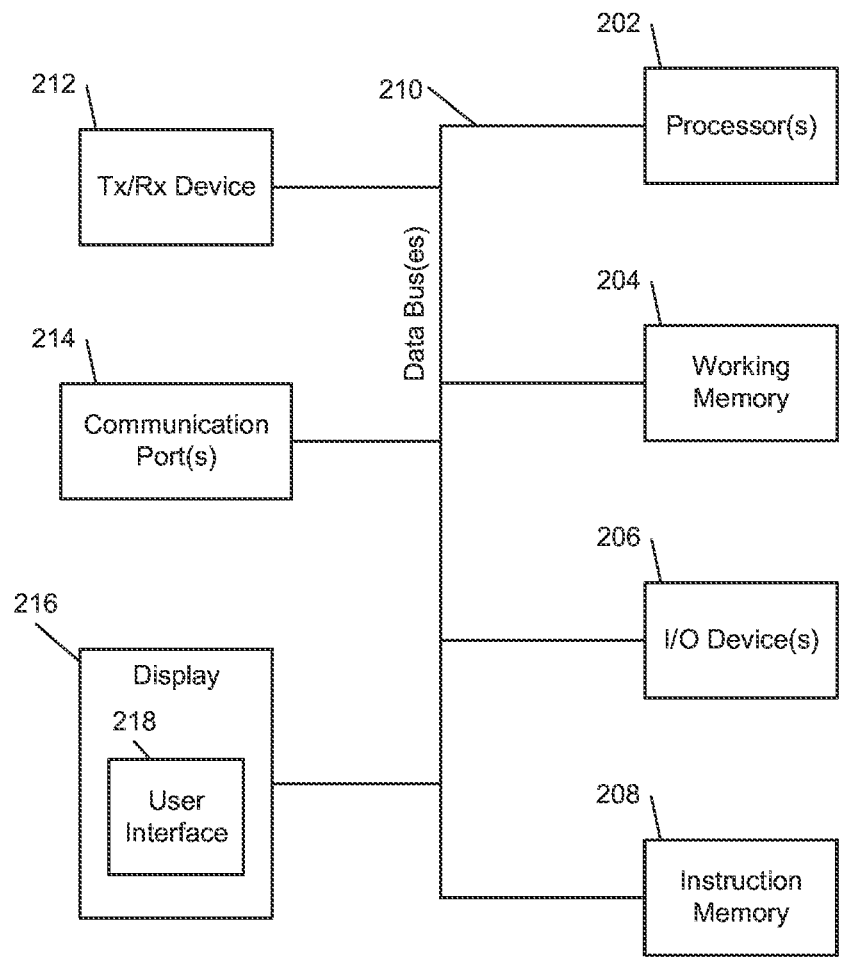
FIG. 2 is a block diagram of a computing device implementing the recommendation device of FIG. 1 in accordance with some embodiments.

FIG. 2 illustrates an example computing device 200. The recommendation device 102, the customer device 104, and/or the analyst device 116 may include the features shown in FIG. 2. For the sake of brevity, FIG. 2 is described relative to the recommendation device 102.

As shown, the recommendation device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the recommendation device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as data items including feedback information.

Display 216 can display a user interface 218. User interfaces 218 can enable user interaction with the recommendation device 102. For example, user interface 218 can be a user interface that allows an operator to interact, communicate, control and/or modify different features or parameters of the recommendation device 102. The user interface 218 can, for example, display the performance of the recommendation device 102 or the generated categorized data items using different textual, graphical or other types of graphs, tables or the like. In some examples, a user can interact with user interface 218 by engaging input-output devices 206. In some examples, display 216 can be a touchscreen, where user interface 218 is displayed on the touchscreen.

Transceiver 212 allows for communication with a network, such as the distributed communications system 108 of FIG. 1. For example, if the distributed communications system 108 of FIG. 1 is a cellular network, transceiver 212 is configured to allow communications with the cellular network. In some examples, transceiver 212 is selected based on the type of distributed communications system 108 in which the recommendation device 102 will be operating. Processor(s) 202 is operable to receive data from, or send data to, a network, such as the distributed communications system 108 of FIG. 1, via transceiver 212.

Figure 3A:
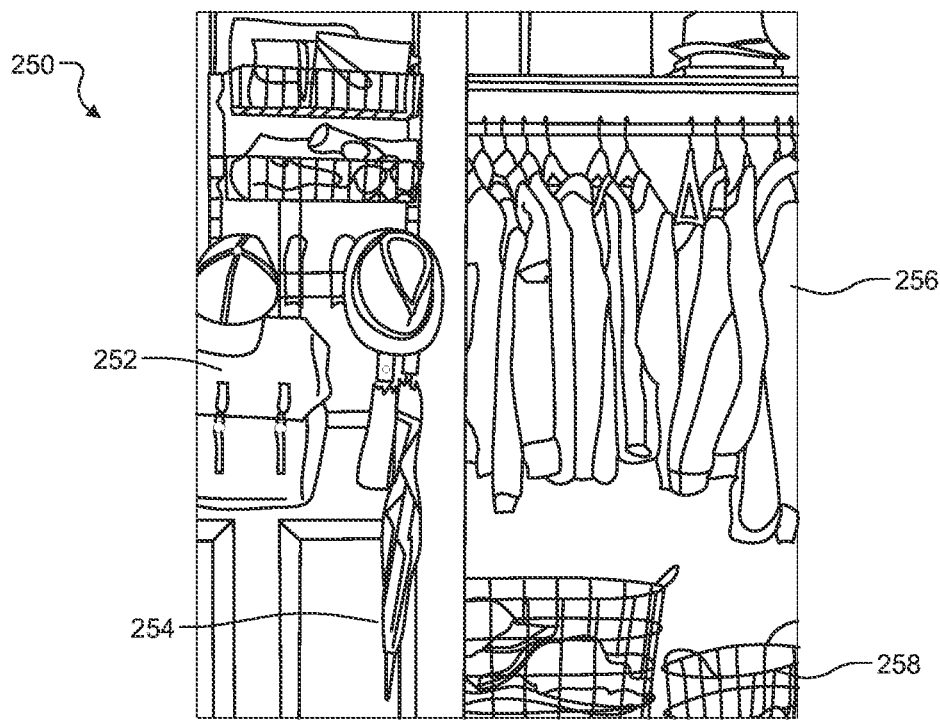
FIGS. 3A and 3B are example graphical images of example assets including a plurality of items.
Figure 3B:
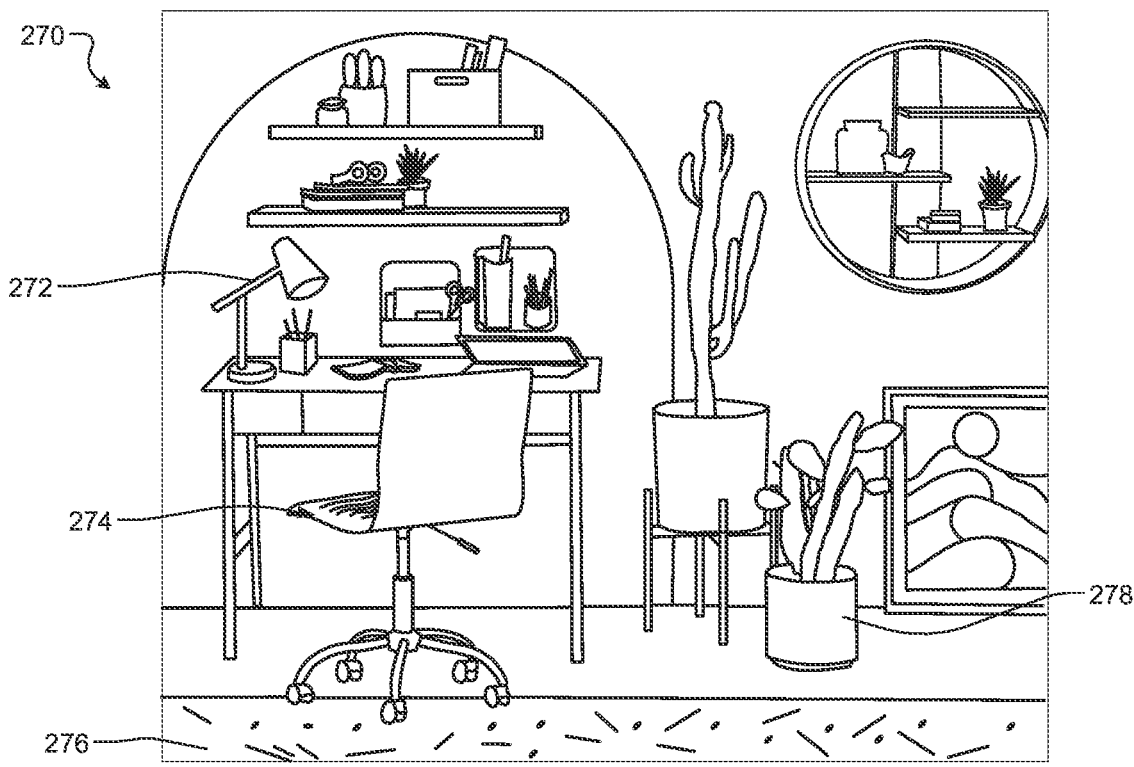

FIGS. 3A and 3B are example graphical images of example assets including a plurality of items. Referring to FIG. 3A, a first asset 250 or asset icon is depicted. For example, the first asset 250 may be displayed on a user interface of a webpage associated with an entity. The first asset 250 is an image including a plurality of items that are linked to and displayed within the first asset 250. In various implementations, the entity may offer the items included in the first asset 250 for sale on the webpage. For example, a first item 252 may be a bag, a second item 254 may be an umbrella, a third item 256 may be a jacket, a fourth item 258 may be a basket, etc. The items linked to and displayed within the first item 250 may all relate to a particular category. For example, in FIG. 3A, the first asset 250 may be categorized as closet storage, bulk storage, etc.

Referring to FIG. 3B, a second asset 270 may include a plurality of other items related to a category of the second asset 270, for example, in this case, office items, office decorations, etc. As shown, the items may include a fifth item 272 that may be a desk lamp, a sixth item 274 that may be a desk chair, a seventh item 276 that may be a rug, an eighth item 278 that may be a potted plant, etc.

Figure 4:
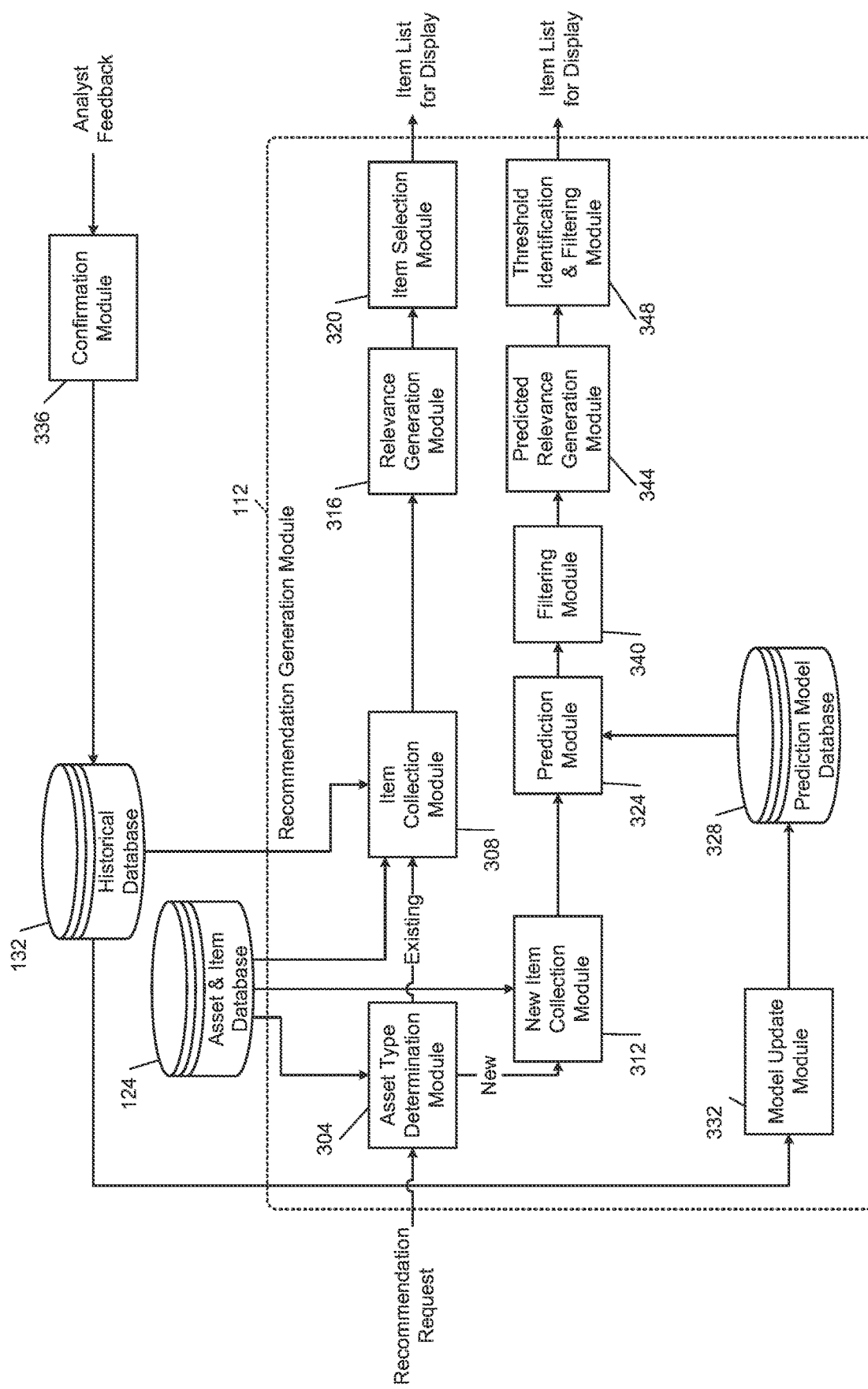
FIG. 4 is a block diagram illustrating an example of a recommendation generation module of the recommendation device of FIG. 1 in accordance with some embodiments.

Referring to FIG. 4, further aspects illustrating an example recommendation generation module 112 are shown. As described previously, the recommendation generation module 112 receives a recommendation request from, for example, the analyst device 116 of FIG. 1. The recommendation request may include an identifier to a particular asset for which the analyst is requesting recommendations for additional items to include in the asset icon. For example, the particular asset may be an existing asset including a set of items that are target items for sale along with prioritized items that the entity or another third party has identified as items to include in the asset as those items are a priority for sale or advertisements. In various implementations, the particular asset may include brand new items or may be a new asset that has not previously been published on the entity's webpage. Otherwise, the particular asset may be existing and the recommendation request may be for the purpose of swapping out previously included items (e.g., the priority of the asset is still bulk storage, but since it is now the fourth quarter, the entity would like to change the extra items in the asset to include items more regularly purchased in the fourth quarter).

The recommendation generation module 112 includes an asset type determination module 304. The asset type determination module 304 determines whether the received asset is new or existing. In various implementations, the asset type determination module 304 may compare the received asset to those assets included in the asset and item database 124 to determine if the same asset identifier of the received asset is included in the asset and item database 124, indicating the asset exists. If the asset is existing, the received asset identifier is forwarded to an item collection module 308. Otherwise, if the asset is determined to be new, the received asset identifier is forwarded to a new item collection module 312.

For existing assets, the item collection module 308 obtains a set of items for the asset and item database 124. The set of items are selected based on a department category and over or within a threshold timeframe. For example, if the received asset identifier is included in a first department category, the item collection module 308 identifies and obtains items included in the first department category and within certain threshold timeframes. For example, the threshold time frame may be over the last year, within the present quarter and an immediately preceding quarter, within the present quarter and immediately preceding quarter of the previously year, etc., or a combination of time-frames. For example, the items may be obtained for the present quarter, e.g., the fourth quarter, the quarter immediately preceding, e.g., the third quarter, and items for the same quarters from the previous year.

The item collection module 308 collects the corresponding asset and item parameters from the asset and item database 124 as well as the corresponding tracked data from the historical database 132, indicating the items purchased as a result of a user selecting the asset. The collected data for the set of items is forwarded to a relevance generation module 316. The relevance generation module 316 determines, for each item of the set of items, a relevance score by determining a harmonic mean of four other scores: order score, string score, keyword score, and image score. As described previously, the order score for an existing item is computed using historical data indicating a propensity to purchase the item based on being displayed or selecting the received asset. The order score may be determined based on the tracked historical data indicating how frequently users are displayed the asset and, due to that display, purchase a particular item or how frequently users select the asset and, as a result, purchase the particular item (e.g., search for the item later, immediately purchase, purchase within the same session, etc.).

The string score is determined by comparing a text description of the asset to a text description of each of the items. As noted above, the semantic similarity may be determined using cosine similarity of feature vectors of the text description, for example, using global vectors or GloVe embeddings. The keyword score is determined similar to the string score, but instead of analyzing text descriptions, the keyword score is determined from the asset name and the name of categories to which each of the items belong (or is tagged). The image score is determined as a similarity between the image of the asset and the image of each of the items, using cosine similarity of feature vectors of the images determined using EfficientNet model weights. As noted previously, the string score, the keyword score, and the image score are computed using the determined feature vectors and calculating the cosine similarity between the asset and each item, and then normalizing the individual scores.

A harmonic mean of the listed four scores is determined as the relevance score. The relevance score for each of the items corresponding to the asset is forwarded to an item selection module 320. The item selection module 320 may determine a threshold relevance score and select all the items above the threshold relevance score. The threshold relevance score may be quantile based, only selecting those items (or item identifiers) within the highest 25% score. For existing assets, only those items that are truly relevant are important to be identified and not necessarily a large number of items. However, for new items, a larger number of items may be important as long as those items may be relevant to the new asset. Once those items above the threshold relevance score are selected, the item selection module 320 transmits a recommended item list for display on, for example, the analyst device. In various implementations, the items may be ordered or ranked according to the relevance score. For example, the item with the highest relevance score may be displayed first. In various implementations, the relevance score may be displayed with the items and the analyst may order the items according to a variety of methods by manipulating user interface element, for example, by selecting highest to lowest relevance score, lowest to highest price, by color, by quarter, etc.

When the asset is new, the new item collection module 312 identifies a set of items based on those items already in the new asset, within threshold timeframe(s), and above a particular content rating. Since the asset is new, the new item collection module 312 identifies all items within each subcategory of the items presently within the asset (e.g., the target items). Similar to the existing asset, the new item collection module 312 identifies all items within those subcategories from the present quarter, the quarter immediately preceding the present quarter, and the items from the present quarter and immediately preceding quarter of the previous year. The new item collection module 312 further filters the identified items by removing those items with a content score lower than a threshold. For example, those items that are rated below, for example, three out of five, may be removed. Since the asset is new, the content score provides a marker as to item popularity since historical data does not exist correlating the items to the new asset. As previously noted, the asset and item database 124 includes data for each asset and item, indicating when the asset and/or was published, content score, image and text embeddings, etc.

The new item collection module 312 also obtains the image and text embeddings of the identified set of items, which are used to calculate the relevance score for the new item paired with each of the items. The item identifiers and collected data is forwarded to a prediction module 324. The prediction module 324 obtains the predictive model from a prediction model database 328. As previously mentioned, the predictive model implements unsupervised machine learning algorithms to predict an order score for the new asset paired with each item of the items. In various implementations, the recommendation generation module 112 includes a model update module 332 that periodically trains the predictive model stored in the prediction model database 328 based on historical data that is analyst confirmed indicating a relevance between an asset and an item or a lack thereof. That is, when a recommendation list is provided to an analyst device, the analyst can approve or deny items, providing feedback to the predictive model. The feedback is received by a confirmation module 336, which updates the correspondence between assets and items, whether the asset is new or existing, in the historical database 132. The model update module 332 may train the predictive model in the prediction model database 328 at threshold intervals using newly received feedback, such as every two weeks.

For example, the model update module 332 may generate training features based on the obtained updated historical data stored in the historical database 132. For example, the model update module 332 may generate feature vectors based on asset and item features corresponding to each asset and item identified in the updated confirmation feedback. Based on the generated training features, the model update module 332 obtains and trains the predictive model, storing the predictive model in the prediction model database 328.

As mentioned previously, the prediction module 324 implements the predictive model, which uses LDA and beta regression to predict the order score for the asset and each identified item. The prediction module 324 uses the obtained image and text embeddings as feature vectors for analysis. Unsupervised LDA is used to reduce the dimensions across the feature vectors for improved analysis of the image and text features, by compressing the volume of the data in terms of observation and reducing variables without losing information or having to compromise for accuracy but improving runtime. The prediction module 324 can predict an order score, using the reduced dimensions of the embeddings, by determining a similarity between each asset and item pair. As noted above the predictive model, over time, can be trained based on analyst feedback indicating which asset and items are paired well together, operating as a validating factor. Beta regression, a form of generalized linear regression, is implemented using a beta distributed variable, which makes the analysis very robust as it is highly skewed towards zero, pairing well with a highly skewed distribution (in various implementations, the distribution may be instead symmetric or skewed towards one). By implementing a beta regression on the predicted order scores of the plurality of asset and item pairs, the prediction module 324 then forwards the beta regression (including the predicted order scores) to a filtering module 340. The filtering module 340 calculates a threshold value for the output of the beta regression to filter or remove those items with a predicted order score below the threshold value.

The filtered set of items is forwarded to a predicted relevance generation module 344. The predicted relevance generation module 344 calculates the string score, the keyword score, and the image score for the remaining asset and item pairs to calculate a harmonic mean of the calculated scores, resulting in the relevance score. The string score, keyword score, and the image score are calculated similar to the methods implemented for an existing asset. The predicted relevance scores are forwarded to a threshold identification and filtering module 348.

The threshold identification and filtering module 348 generates a cumulative distribution (CDF) plot of the predicted relevance scores. The threshold identification and filtering module 348 fits y=f (x) to create a smooth, continuous and differentiable function, also implementing polynomial and splines. The generated CDF plot is increasing such that $$\frac{dy}{dx} > 0 \text{ for } \forall\, x \in (0, 1),$$

located according to the following equations:

$$\frac{d^2y}{dx^2} = 0 \text{ for } \forall\, x = c$$

$$\frac{d^2y}{dx^2} > 0 \text{ for } \forall\, x \in (0, c) \,\&\, \frac{d^2y}{dx^2} < 0 \text{ for } \forall\, x \in (c, 1)$$

Then, to find the optimal threshold relevance score after the inflection point:

$$S = \{x : x \in (k - \lambda, k + \lambda)\}, \text{ where, } k \text{ is } \frac{dy}{dx} <= \varepsilon \text{ for } \forall\, x \in (c, 1).$$

Using S, optimal threshold relevance score t is determined using the following equation:

$$t = \underset{x}{\mathrm{argmax}} \frac{d^2y}{dx^2} \text{ for } \in S$$

Using the optimal threshold relevance score, those items with a relevance score below the optimal threshold relevance score are removed or excluded in the recommendation list. The threshold identification and filtering module 348 forwards the recommended item list to the analyst device that requested the list for display. As was true for the existing asset, the analyst may select items from the recommended item list to include in the new asset, which may be provided as analyst feedback to improve the predictive model. Further, the analyst may provide additional validating feedback, such as which items are not relevant. Additionally, as noted with an existing asset, the items of the recommended item list may be ordered or ranked according to the relevance score, price, etc.

Figure 5:
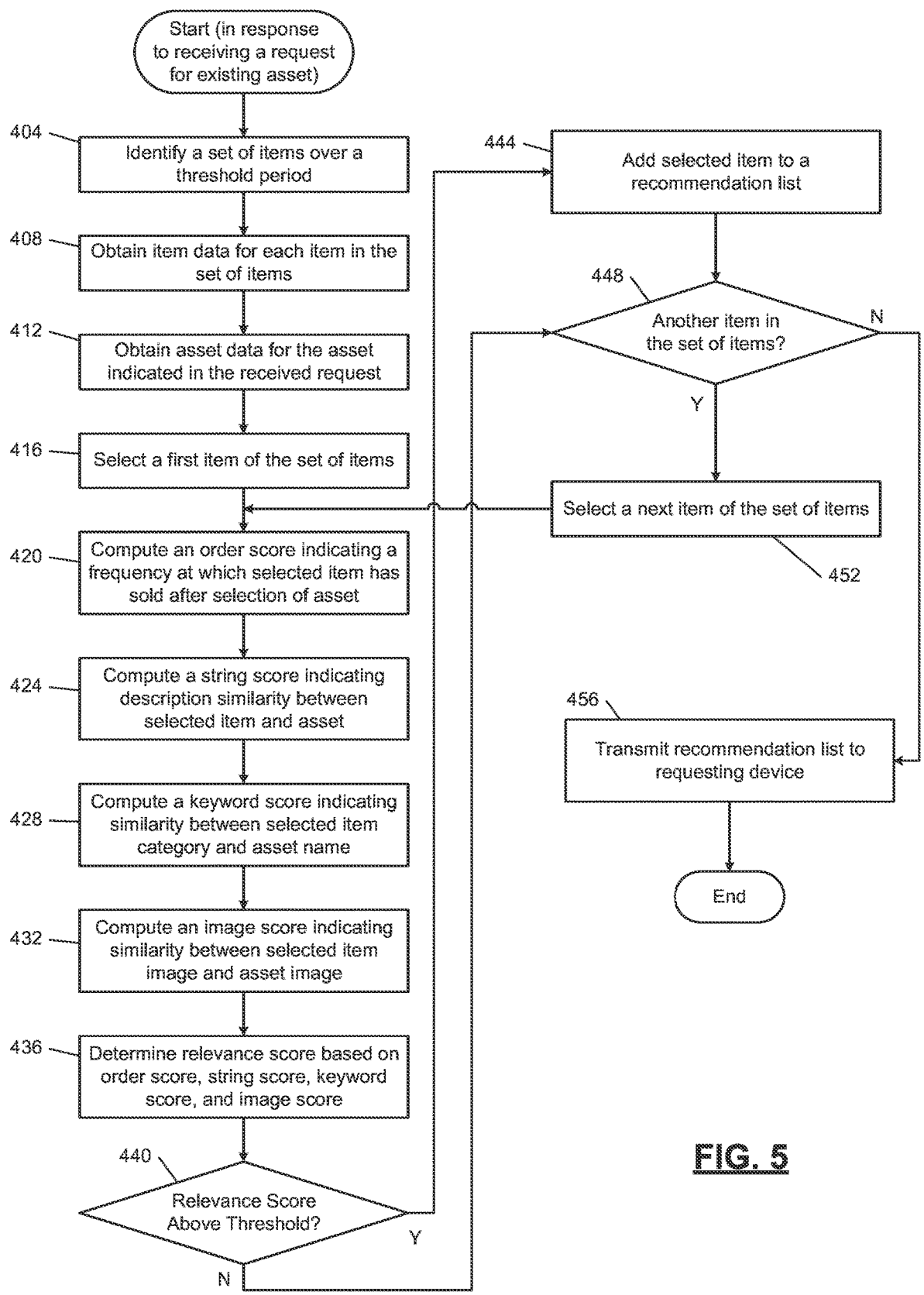
FIG. 5 is a flowchart of example methods of generating item recommendations for an existing asset in accordance with some embodiments.

Referring now to FIG. 5, a flowchart of example methods of generating item recommendations for an existing asset is shown. Control begins in response to receiving a request for recommendations for an existing asset. Control continues to 404 to identify a set of items over a threshold period. As described previously, the set of items may specifically corresponding to a category or department to which the asset belongs and have been published on the entity's website during threshold timeframes (e.g., during the present quarter over this year and last year as well as a previous quarter this year and last year). In various implementations, items published during a previous quarter, immediately prior to the present quarter, are included in order to ensure items that related to both quarters are included.

Once the set of items are identified, control proceeds to 408 to obtain item data for each item in the set of items. The item data corresponds to the information used as features in determining similarity between the asset and each item of the set of items by calculating the plurality of scores. For example, item data includes, for each item of the set of items, historical selection or click data associated with any purchases, text description, keyword or category description, image, etc. Control continues to 412 to obtain asset data for the asset indicated in the received request, including a text description, name or category, image, etc. Control then continues to 416 to select a first item of the set of items. At 420, control computes an order score indicating a frequency at which the selected item has sold after selection of the received asset. That is, as described previously, the order score is determined based on feature vectors composed of historical data regarding propensity or frequency of purchases of the selected item that occurred as a result of an interaction or view of the received asset.

Control continues to 424 to compute a string score indicating description similarity between the selected item and the asset. The string score analyzes the text description of the selected item and the asset by identifying global vectors (GloVe), which are used as feature vectors to determine the cosine similarity between the selected item and the asset. Control proceeds to 428 to computing a keyword score indicating a similarity between the keywords from a selected item category or categories and the asset name. Category keywords are obtained by a Text Rank algorithm. Control also identifies feature vectors using GloVe and then determines the cosine similarity between the keywords. Control continues to 432 to compute an image score indicating a similarity between the selected item image and the asset image. The images are analyzed using EfficientNet to generate feature vectors to determine the cosine similarity. Each score in steps 420 through 432 may be normalized during the respective step. Then, at 436, control determines the relevance score based on the order score, the string score, the keyword score, and the image score. In various implementations, the relevance score is a harmonic mean of the determined scores.

Control proceeds to 440 to determine if the relevance score is above a threshold value. While not shown, the threshold may be determined based on the relevance scores of each of the items of the set of items. That is, control may, instead, after each relevance score is determined, implement a clustering algorithm or quantile based threshold to identify a threshold value. Otherwise, as shown in FIG. 5, the threshold may be a preset threshold to ensure only those items that are truly relevant are added to a recommendation list.

If the relevance score is above the threshold, control proceeds to 444 to add the selected item to a recommendation list. Otherwise, if the relevance score is below the threshold and after adding the selected item to the recommendation list, control proceeds to 448 to determine if another item is in the set of items. If yes, control continues to 452 to select a next item of the set of items and returns to 420. Otherwise, control continues to 456 to transmit the recommendation list to the requesting device (e.g., the analyst device) for display. As previously noted, in various implementations, the analyst device display a user interface with the items on the recommendation list as selectable to provide feedback indicting whether the item should be included in the asset or whether the item is not relevant to the asset. Then, control ends.

Referring now to FIG. 6, a flowchart of example methods of generating item recommendations for a new asset is shown. Control begins in response to receiving a recommendation request for a new asset. For example, as noted previously, the new asset may be submitted or identified with the recommendation request. Control may compare the asset to an existing database to determine the asset is new. Control continues to 504 to identify a set of items over a threshold period. Similar to FIG. 5, the identified set of items may correspond to particular categories associated with the new asset. For example, control may identify items included in the new asset, such as target items. Then, control may identify and select items included in each category of the target items already in the new asset. The identified and selected items may be further limited based on the threshold period (e.g., as described previously, limited to the present quarter, the quarter immediately before the present quarter, and the same quarters in the previous year). In various implementations, considering the time frame during which items are published on the entity's website further provides a method by which to determine when to no longer include the item in assets by identifying whether those items are relevant for the present asset, existing or new. Further, control may filter the identified and selected items based on content score or customer reviews. That is, to ensure the set of items excludes items that are not liked by customers, control can remove any items with a low content score (e.g., less than three out of five stars, less than 50% positive reviews or scores, etc.).

Control continues to 508 to obtain data (e.g., text descriptions, keywords, images, etc.) as well as text and image embedding for each item of the set of items and the new asset. For example, the text and image embeddings may be stored in a database. Control proceeds to 512 to predict an order score for the asset and selected item pair for each item of the set of items and reducing features using LDA. As previously described, features are extracted from the image and item embeddings for each item and the new asset, LDA is used to reduce the features, improving speed and performance. The order scores may be predicted based on historical data that analysts have validated and fed back into a predictive model implementing machine learning algorithms. Additionally or alternatively, the predicted order score may be determined based on a similarity of the reduced feature vectors of the embeddings. Control proceeds to 516 to determine a threshold order score using a beta regression method to further discriminate between order scores relevant to the asset and not relevant to the asset. In various implementations, the threshold order score is based on sample quantiles.

Control continues to select a first item of the second of items at 520. Then, at 524 control determines if the predicted order score of the selected item is less than the threshold order score. If no, control continues to 528 to compute a string score indicating description similarity between the selected item and asset, as previously described in FIG. 5. Control continues to 532 to compute a keyword score indicating similarity between the selected item category and the asset name, as previously described in FIG. 5. Then, control proceeds to 536 to compute an image score indicating a similarity between the selected item image and asset image, as previously described in FIG. 5. Control continues to 540 to determine a relevance score based on the predicted order score, the string score, the keyword score, and the image score, previously described in FIG. 5. Then, control continues to 544. Returning to 524, if the predicted order score of the selected item is less than the threshold, control continues directly to 544.

At 544, control determines if another item is in the set of items. If yes, control continues to 548 to select a next item of the set of items and returns to 524. Otherwise, control proceeds to 552 to generate a plot of the CDF of the relevance score for each item of the set of items. Control continues to 556 to identify a threshold relevance score on the CDF plot. As described previously, the threshold relevance score (optimal threshold) is identified as a point at which the relevance score levels off after an inflection point. Control continues to 560 to add each item of the set of items with a corresponding relevance score above the threshold relevance to a recommendation list. Control proceeds to 564 to transmit the recommendation list to the request device (analyst device). Then, control ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system, comprising:
a database storing a plurality of item identifiers and a plurality of asset identifiers, each item identifier of the plurality of item identifiers being associated with item data and a published timeframe, and each asset identifier of the plurality of asset identifiers being associated with asset data and a previously published indicator; and
a processor;
a non-transitory memory storing instructions, that when executed, cause the processor to:
receive an item recommendation request corresponding to an asset from a computing device;
select, based on the item recommendation request, a set of item identifiers of the plurality of item identifiers, the published timeframe of each of the selected item identifiers being related to a present timeframe;
receive historical interaction data associated with the asset, wherein the historical interaction data is generated by a click tracking module that records user interactions with at least the asset, and wherein the click tracking module associates the asset with user interactions if a threshold number of user interactions is not exceeded;
generate a respective image score representative of a similarity between an item image associated with the item data and an asset image associated with the asset based on a first trained machine learning model, wherein the first trained machine learning model is based on unsupervised linear discriminant analysis to reduce one or more dimensions across extracted feature vectors associated with the item image and the asset image;
determine a composite similarity value for each item identifier of the set of item identifiers comparing a similarity of the asset to each item identifier of the set of item identifiers, wherein the composite similarity value comprises a harmonic mean of:
an order score representative of a likelihood of interaction with the item data of a corresponding item identifier, wherein the order score comprises a first historical order score when the historical interaction data includes user interactions indicating a relevance between an item identifier of the set of item identifiers and the asset, and wherein the order score comprises a predicted order score when the historical interaction data does not include user interactions indicating a relevance between an item identifier of the set of item identifiers and the asset;
a string score representative of a similarity of the item data of the corresponding item identifier and the asset data of the asset;
a keyword score representative of a similarity between keywords associated with the item data and an asset name associated with the asset; and
the respective image score representative of the similarity between the item image associated with the item data and the asset image associated with the asset,
wherein the string score or the keyword score is generated by a second trained machine learning model utilizing a first labeled training dataset comprising historically identified relevant items for the asset and validation labels;
generate an item recommendation list including each item identifier of the set of item identifiers where the respective composite similarity value is above a threshold value;
transmit instructions to the computing device that cause the computing device to display a user interface including interface elements representative of the item recommendation list;
receive feedback data representative of additional user interactions with the displayed user interface including validation or rejection of at least one item identifier in the item recommendation list;
generate an updated second trained machine learning model based on a second labeled training dataset, wherein the second labeled training dataset is generated by removing items from the first labeled training dataset based on the feedback data, and the first trained machine learning model and the second trained machine learning model include a plurality of processing layers, each processing layer of the plurality of processing layers associated with trainable filters, transformations, projections, hashing, pooling, and regularization; and
generate an updated item recommendation list for display including an updated set of item identifiers based on respectively updated composite similarity values, wherein each of the updated composite similarity values includes at least one updated score generated by the updated second trained machine learning model and an updated order score comprising a second historical order score generated at least in part based on the feedback data, wherein the updated set of item identifiers is different than the set of item identifiers.

2. The system of claim 1, wherein the instructions cause the processor to, in response to determining the asset is a new asset based on the corresponding previously published indicator:
extract asset features from corresponding asset data;
extract item features for each item identifier of the set of item identifiers from respective item data;
reduce a number of the extracted asset features and item features;
compute the order score for each item identifier of the set of item identifiers using a predictive model based on the reduced number of the extracted asset features and item features; and
reduce the set of item identifiers based on the corresponding order score being less than a determined threshold order value.

3. The system of claim 2, wherein reducing the number of the extracted asset features and item features includes implementing linear discriminant analysis.

4. The system of claim 2, wherein reducing the set of item identifiers includes:

applying a beta regression to the computed order scores for each item identifier of the set of item identifiers; and determining the threshold order value as a pre-defined sample quantile.

5. The system of claim 2, wherein the predictive model comprises a third trained machine learning model generated, at least in part, by a supervised training processes using the feedback received from the computing device.

6. The system of claim 1, wherein the string score comprises a semantic similarity between a text description of the asset included in the asset data and a text description of the selected item identifier included in the item data.

7. The system of claim 1, wherein the keyword score comprises a semantic similarity between keywords of the asset included in the asset data and keywords from a category description of at least one category corresponding to the selected item identifier included in the item data.

8. The system of claim 1, wherein the instructions cause the processor to, in response to determining the asset is an existing asset based on the corresponding previously published indicator, compute the order score for each item identifier of the set of item identifiers based on historical data related to the asset and the respective item.

9. The system of claim 1, wherein the second trained machine learning model comprises a global vectors (GloVe) model that determines one of the string score or the keyword score, and wherein the first trained machine learning model comprises an EfficientNet model that determines the image score.

10. The system of claim 1, wherein each of the order score, the string score, the keyword score, and the image score are normalized prior to determining the harmonic mean.

11. A computer-implemented method, comprising:
receiving an item recommendation request corresponding to an asset from a computing device;
selecting, based on the item recommendation request, a set of item identifiers of a plurality of item identifiers, an associated published timeframe of the selected item identifiers being related to a present timeframe, the plurality of item identifiers and a plurality of asset identifiers being stored in a database, each item identifier of the plurality of item identifiers being associated with item data and a published timeframe, and each asset identifier of the plurality of asset identifiers being associated with asset data and a previously published indicator;
receiving historical interaction data associated with the asset, wherein the historical interaction data is generated by a click tracking module that records user interactions with at least the asset, and wherein the click tracking module associates the asset with user interactions if a threshold number of user interactions is not exceeded;
generating a respective image score representative of a similarity between an item image associated with the item data and an asset image associated with the asset based on a first trained machine learning model, wherein the first trained machine learning model is based on unsupervised linear discriminant analysis to reduce one or more dimensions across extracted feature vectors associated with the item image and the asset image;
determining a composite similarity value for each item identifier of the set of item identifiers comparing a similarity of the asset to each item identifier of the set of item identifiers, wherein the composite similarity value comprises a harmonic mean of:
an order score representative of a likelihood of interaction with the item data of a corresponding item identifier, wherein the order score comprises a first historical order score when the historical interaction data includes user interactions indicating a relevance between an item identifier of the set of item identifiers and the asset, and wherein the order score comprises a predicted order score when the historical interaction data does not include user interactions indicating a relevance between an item identifier of the set of item identifiers and the asset;
a string score representative of a similarity of the item data of the corresponding item identifier and the asset data of the asset;
a keyword score representative of a similarity between keywords associated with the item data and an asset name associated with the asset; and
the respective image score representative of the similarity between the item image associated with the item data and the asset image associated with the asset,
wherein the string score or the keyword score is generated by a second trained machine learning model utilizing a first labeled training dataset comprising historically identified relevant items for the asset and validation labels;
generating an item recommendation list including each item identifier of the set of item identifiers with the respective composite similarity value above a threshold value;
transmitting instructions to the computing device that cause the computing device to display a user interface including interface elements representative of the item recommendation list;
receiving feedback data representative of additional user interactions with the displayed user interface including validation or rejection of at least one item identifier in the item recommendation list;
generating an updated second trained machine learning model based on a second labeled training dataset, wherein the second labeled training dataset is generated by removing items from the first labeled training dataset based on the feedback data, and the first trained machine learning model and the second trained machine learning model include a plurality of processing layers, each processing layer of the plurality of processing layers associated with trainable filters, transformations, projections, hashing, pooling, and regularization; and
generating an updated item recommendation list for display including an updated set of item identifiers based on updated composite similarity values, wherein each of the updated composite similarity values includes at least one updated score generated by the updated second trained machine learning model and an updated order score comprising a second historical order score generated at least in part based on the feedback data, wherein the updated set of item identifiers is different than the set of item identifiers.

12. The method of claim 11, further comprising, in response to determining the asset is a new asset based on the corresponding previously published indicator:
extracting asset features from corresponding asset data;
extracting item features for each item of the set of item identifiers from respective item data;

reducing a number of the extracted asset features and item features;

computing the order score for each item identifier of the set of item identifiers using a predictive model based on the reduced number of the extracted asset features and item features; and reducing the set of item identifiers based on the corresponding order score being less than a determined threshold order value.

13. The method of claim 12, wherein reducing the number of the extracted asset features and item features includes implementing linear discriminant analysis.

14. The method of claim 12, wherein reducing the set of item identifiers includes:

applying a beta regression to the computed order scores for each item identifier of the set of item identifiers; and determining the threshold order value as a pre-defined sample quantile.

15. The method of claim 12, wherein the predictive model comprises a third trained machine learning model generated, at least in part, by a supervised training processes using the feedback received from the computing device.

16. The method of claim 11, wherein the string score comprises a semantic similarity between a text description of the asset included in the asset data and a text description of the selected item identifier included in the item data.

17. The method of claim 11, wherein the keyword score comprises a semantic similarity between keywords of the asset included in the asset data and keywords from a category description of at least one category corresponding to the selected item identifier included in the item data.

18. The method of claim 11, wherein the second trained machine learning model comprises a global vectors (GloVe) model configured to determine one of the string score or the keyword score, and wherein the first trained machine learning model comprises an EfficientNet model that determines the image score.

19. The method of claim 11, wherein each of the order score, the string score, the keyword score, and the image score are normalized prior to determining the harmonic mean.

20. A non-transitory computer readable medium having instructions stored thereon, wherein the instructions, when executed by at least one processor, cause a device to perform operations comprising:

receiving an item recommendation request corresponding to an asset from a computing device;

selecting, based on the item recommendation request, a set of item identifiers of a plurality of item identifiers, an associated published timeframe of the selected item identifiers being related to a present timeframe, the plurality of item identifiers and a plurality of asset identifiers being stored in a database, each item identifier of the plurality of item identifiers being associated with item data and a published timeframe, and each asset identifier of the plurality of asset identifiers being associated with asset data and a previously published indicator;

receiving historical interaction data associated with the asset, wherein the historical interaction data is generated by a click tracking module that records user interactions with at least the asset, and wherein the click tracking module associates the asset with user interactions if a threshold number of user interactions is not exceeded;

generate a respective image score representative of a similarity between an item image associated with the item data and an asset image associated with the asset based on a first trained machine learning model, wherein the first trained machine learning model is based on unsupervised linear discriminant analysis to reduce one or more dimensions across extracted feature vectors associated with the item image and the asset image;

determining a composite similarity value for each item identifier of the set of item identifiers comparing a similarity of the asset to each item identifier of the set of item identifiers, wherein the composite similarity value comprises a harmonic mean of:

an order score representative of a likelihood of interaction with the item data of a corresponding item identifier, wherein the order score comprises a first historical order score when the historical interaction data includes user interactions indicating a relevance between an item identifier of the set of item identifiers and the asset, and wherein the order score comprises a predicted order score when the historical interaction data does not include user interactions indicating a relevance between an item identifier of the set of item identifiers and the asset;

a string score representative of a similarity of the item data of the corresponding item identifier and the asset data of the asset;

a keyword score representative of a similarity between keywords associated with the item data and an asset name associated with the asset; and the respective image score representative of the similarity between the item image associated with the item data and the asset image associated with the asset, wherein the string score or the keyword score is generated by a second trained machine learning model utilizing a first labeled training dataset comprising historically identified relevant items for the asset and validation labels;

generating an item recommendation list including each item identifier of the set of item identifiers with the respective composite similarity value above a threshold value;

transmitting instructions to the computing device that cause the computing device to display a user interface including interface elements representative of the item recommendation list;

receiving feedback data representative of additional user interactions with the displayed user interface including validation or rejection of at least one item identifier in the item recommendation list;

generating an updated second trained machine learning model based on a second labeled training dataset, wherein the second labeled training dataset is generated by removing items from the first labeled training dataset based on the feedback data, and the first trained machine learning model and the second trained machine learning model include a plurality of processing layers, each processing layer of the plurality of processing layers associated with trainable filters, transformations, projections, hashing, pooling, and regularization; and generating an updated item recommendation list for display including an updated set of item identifiers based on respectively updated composite similarity values, wherein each of the updated composite similarity values includes at least one updated score generated by the updated second trained machine learning model and an updated order score comprising a second historical order score generated at least in part based on the feedback data, wherein the updated set of item identifiers is different than the set of item identifiers.

* * * * *